US006546729B2

(12) United States Patent
Hellat et al.

(10) Patent No.: US 6,546,729 B2
(45) Date of Patent: Apr. 15, 2003

(54) DAMPER ARRANGEMENT FOR REDUCING COMBUSTION-CHAMBER PULSATIONS

(75) Inventors: Jaan Hellat, Baden-Ruetihof (CH); Stefan Tschirren, Nunningen (CH); Peter Stuber, Zurich (CH); Christian Oliver Paschereit, Baden (CH)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/988,307

(22) Filed: Nov. 19, 2001

(65) Prior Publication Data

US 2002/0100281 A1 Aug. 1, 2002

(30) Foreign Application Priority Data

Nov. 25, 2000 (DE) ........................................ 100 58 688

(51) Int. Cl.[7] ................................................. F02C 7/00
(52) U.S. Cl. ......................................... 60/725; 431/114
(58) Field of Search .......................... 60/725; 181/213; 431/114

(56) References Cited

U.S. PATENT DOCUMENTS 5,373,695 A * 12/1994 Aigner et al. ................. 60/725
5,685,157 A * 11/1997 Pandalai et al. .............. 60/725
6,464,489 B1 * 10/2002 Gutmark et al. .............. 60/725

FOREIGN PATENT DOCUMENTS

| | | |
|---|---|---|
| CH | 261468 | 8/1949 |
| DE | 196 40 980 A1 | 4/1998 |
| EP | 0 039 459 | 11/1981 |
| EP | 0 387 532 B1 | 9/1990 |
| GB | 656430 | 8/1951 |

* cited by examiner

*Primary Examiner*—Louis J. Casaregola
(74) *Attorney, Agent, or Firm*—Burns, Doane, Swecker & Mathis, L.L.P.

(57) ABSTRACT

The invention relates to a damper arrangement for reducing combustion-chamber pulsations arising inside a gas turbine (1), having a combustion-chamber housing (8) which upstream comprises a front plate (2) with a plurality of individual burners (6) and damping elements (7, **7*a*, 7*b*) projecting through the front plate (2) and downstream is connected to a turbine stage (9) and is surrounded by a turbine housing (3) which comprises first openings (5*a*) which are adapted to the burners (6) and through which the burners (6**) project upstream.

Figure 1:
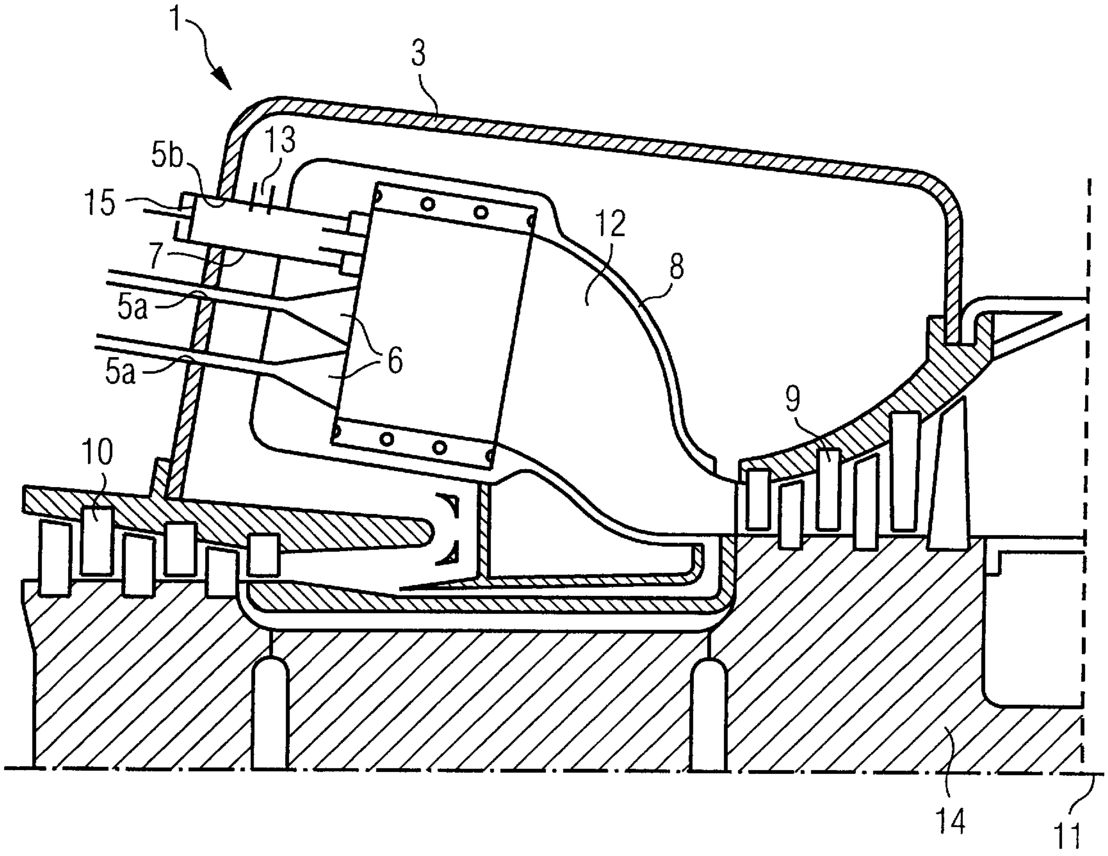

The invention is characterized in that closable second openings (**5*b*), through which it is possible to insert and tune the damping elements (7, 7*a*, 7*b*), are provided inside the turbine housing (9) adjacent to the first openings (5*a*) adapted to the burners (6**).

14 Claims, 4 Drawing Sheets

DAMPER ARRANGEMENT FOR REDUCING COMBUSTION-CHAMBER PULSATIONS

TECHNICAL FIELD

The invention relates to the field of turbo-engines. It relates to a damper arrangement for reducing combustion-chamber pulsations in a gas turbine.

PRIOR ART

In the combustion of liquid or gaseous fuels in a combustion chamber of a gas turbine the so-called lean pre-mix combustion has become customary. In this case the fuel and the combustion air are pre-mixed as uniformly as possible and are then fed into the combustion chamber. In order to take account of ecological considerations, care is taken to have a low flame temperature by means of a substantial excess of air. In this way, the formation of nitrogen oxide can be kept low. A combustion chamber of a gas turbine with pre-mix burners is known for example from EP 387 532 A1.

In combustion chambers of this type, mutual building-up between thermal and acoustic interference results in so-called thermoacoustic oscillations which can thus assume large oscillation amplitudes in which the gas turbine reaches its limit of mechanical loading. In order to prevent this, dampers, by which the possible oscillation amplitudes are reduced or even eliminated, are provided in present-day gas-turbine combustion chambers.

By way of example, EP 597 138 B1 discloses an annular combustion chamber with burners and dampers which are secured inside the front plate of the annular combustion chamber and which are arranged alternately adjacent to one another in the peripheral direction. The dampers are accessible by way of a closable manhole in the external generated face of the annular combustion chamber and can thus be set manually in their damping frequency. This setting capacity is important since after the initial operation of a gas turbine the pulsation frequencies and the spatial formation of the combustion-chamber pulsations in the combustion chamber can be detected and suitable damping steps can be taken only under operating conditions. As is known, the damping to be achieved involves the damping of so-called noiseless components, in which individual frequency peaks in the noise spectrum should be reduced. The narrow-band oscillation excitations of high amplitude in the frequency range of from 50 to 600 Hz are typically found. The dampers used are so-called Helmholtz resonators and $\lambda/4$ tubes which have to be tuned in terms of their damping frequency in accordance with the oscillation amplitude to be damped.

Intervention into the damping frequency of the dampers makes it necessary to uncover the gas turbine insofar as the opening of the annular combustion chamber and then the assembly of suitably tuned damping elements is possible. In terms of the shutdown of the machine this intervention into the gas turbine is correspondingly time-consuming and costly and it requires extreme care with respect to the operating technology, since no articles which could subsequently possibly lead to failure of the highly sensitive blade mounting of a machine at its loading limit can be allowed to remain in the gas turbine. Furthermore, the tuning of the damping frequency of the damping elements is possible only within specific limits. One restriction may be seen in the conditions of space which are available in the combustion chamber. In addition, the various combustion-chamber pulsations cannot be taken into consideration in their entire scope in different operating states of the gas turbine, such as full load or partial load, gas operation or oil operation in conjunction with a varying ambient temperature and different fuel/air ratios with the fixed installation of the dampers. In this way, frequency peaks can remain at particular loading points and operating states, and, although their effect is not immediately harmful, it is nevertheless desirable to reduce their level.

Although the damper installation known from the said EP 597 138 allows sufficiently satisfactory damping characteristics, it is limited in its flexibility in adjusting the gas turbine to changed situations in the overall system in a simple manner.

DE 196 40 980 likewise discloses a device for damping thermoacoustic oscillations in a combustion chamber, in which the damper arrangement comprises a Helmholtz resonator with a resonance volume and a damping tube. In order to achieve a greater damping performance the Helmholtz resonator is provided with a wall which is designed in the form of a mechanical spring. In addition, a mechanical mass, by which the virtual volume of the Helmholtz resonator is influenced, is arranged on this oscillating wall of the resonance volume. This known Helmholtz resonator is not readily accessible either for the purpose of subsequent adjustment of the damping frequency. This installation as well requires in fact correspondingly time-consuming and costly dismantling and assembly steps for tuning the damping frequencies.

DISCLOSURE OF THE INVENTION

The object of the invention is to provide a damper arrangement for reducing combustion-chamber pulsations arising inside a gas turbine, in such a way that it is possible to achieve improved damping characteristics by damper arrangements which are simple to install and easily accessible and the damping characteristics of which can, in addition, be set without substantial outlay. In this case it should be possible at least to set the damping frequencies without switching off or even uncovering the gas turbine. In addition, it should be possible to use relatively large damper volumes without substantial interference in known geometries of combustion chambers, these relatively large damper volumes having damping characteristics which were hitherto unattainable.

This object is attained as set out in claim 1. The damper arrangement according to the invention for a gas turbine is characterized in that further closable openings, through which damping elements can be inserted and tuned, are provided inside the turbine housing adjacent to the openings adapted to the burners. It is particularly advantageous that, in order to insert and/or tune a damping element, it is only necessary for this closable opening to be uncovered, which is possible in a more simple and rapid manner than in the case of the necessary steps on conventional gas-turbine plants. The damping elements can be inserted, as it were, from the outside through the turbine housing, without substantial areas of a gas turbine having to be uncovered in time-consuming and costly procedures, merely to allow access to the interior of the gas-turbine housing.

It is additionally important that the burners and the damping elements are interchangeable with one another, since the openings in a preferred embodiment for the burners and the openings for the damping elements are designed in an identical manner. Identically designed openings for burners and damping elements allow burners to be replaced by damping elements in the immediate vicinity of sites with increased pulsations in a combustion chamber and damping elements to be replaced by burners at sites with low thermoacoustic interference. This results in the greatest possible flexibility in effecting an optimum damping of combustion-chamber pulsations. In this way, the arrangement according to the invention has also made it possible to meet the long-standing requirement of providing a completely individual adaptation of a gas turbine in situ in a simple manner. As is known, only a detection of the combustion-chamber pulsations at various loading points can in fact be carried out after the initial operation. This procedure is performed in a particularly simple manner by damping elements which can be inserted and set from the outside and it permits an extremely rapid process in the tuning as a whole.

The openings for the burners in a front plate immediately towards the combustion chamber are advantageously arranged in such a way that the damping elements can also be flange-mounted on these openings. A distance is provided between the openings in the front plate and the closable openings in the turbine housing in such a way that the damping elements can be inserted therein completely.

A further advantageous arrangement of the invention provides that the damping elements project through the closable openings and out of the turbine housing. In this case the damping elements can be manipulated extremely easily from the outside, so that tuning of installed damping elements is possible in a simple manner even during the operation of the gas turbine. In this way, the tuning of the damping elements in the gas turbine can be carried out at different loading points, without the machine having to be shut down in the meantime. As a result, it is no longer necessary to carry out a time-consuming iterative procedure in order to move to specific loading points and subsequently to perform an associated tuning.

In a modem gas turbine with an annular combustion chamber the damping elements can occupy any position which a burner can also occupy, namely adjacent to one another radially or adjacent to one another in the peripheral direction.

It is advantageous for $\lambda/4$ tubes and Helmholtz resonators to be used as the damping elements, which are additionally provided towards the outside with a tuning device which allows the damper volumes to be influenced directly.

Higher oscillation frequencies can typically be damped with $\lambda/4$ tubes and lower oscillation frequencies with Helmholtz resonators, the frequency range of the thermoacoustic interference being limited between approximately 50 Hz at the bottom and approximately 600 Hz at the top.

In addition, it is possible to set each damping element by means of a tuning device whether the regulating circuit is opened or closed. In the case of a closed regulating circuit the oscillating frequencies of the combustion-chamber pulsations are fed directly to the said regulating circuit. The closed regulating circuit allows an automatic tuning of the damping elements, so that the damping frequencies are adapted as precisely as possible to the oscillating frequencies of the thermoacoustic interference at each operating point of the gas turbine.

In the case of an open regulating circuit, on the other hand, the damping elements can be set with external control and regulating variables.

BRIEF DESCRIPTION OF THE INVENTION

Figure 2A:
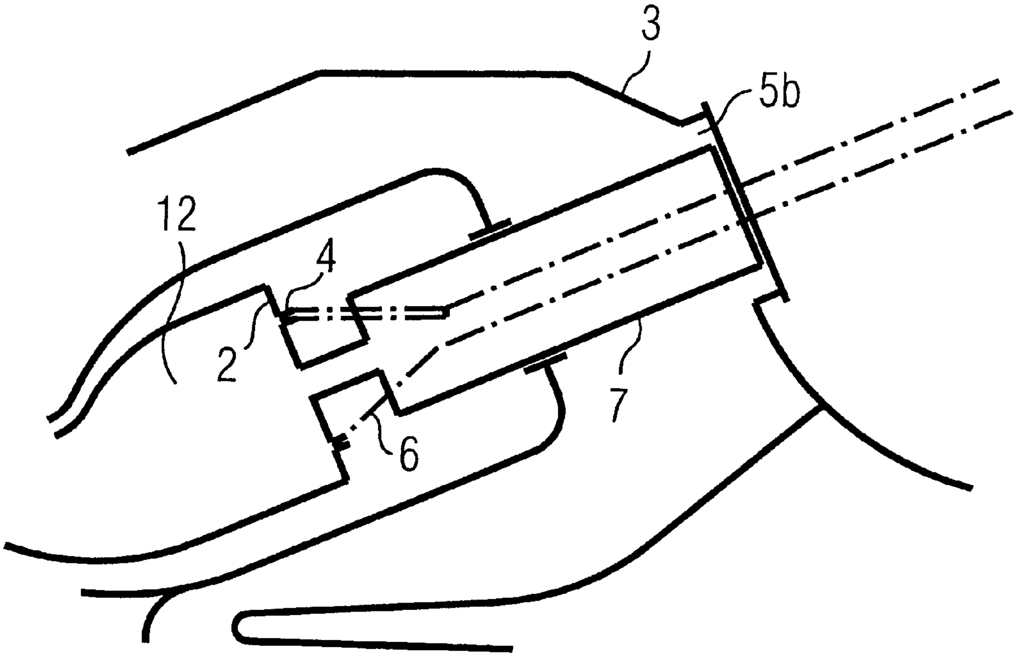
Figure 2B:
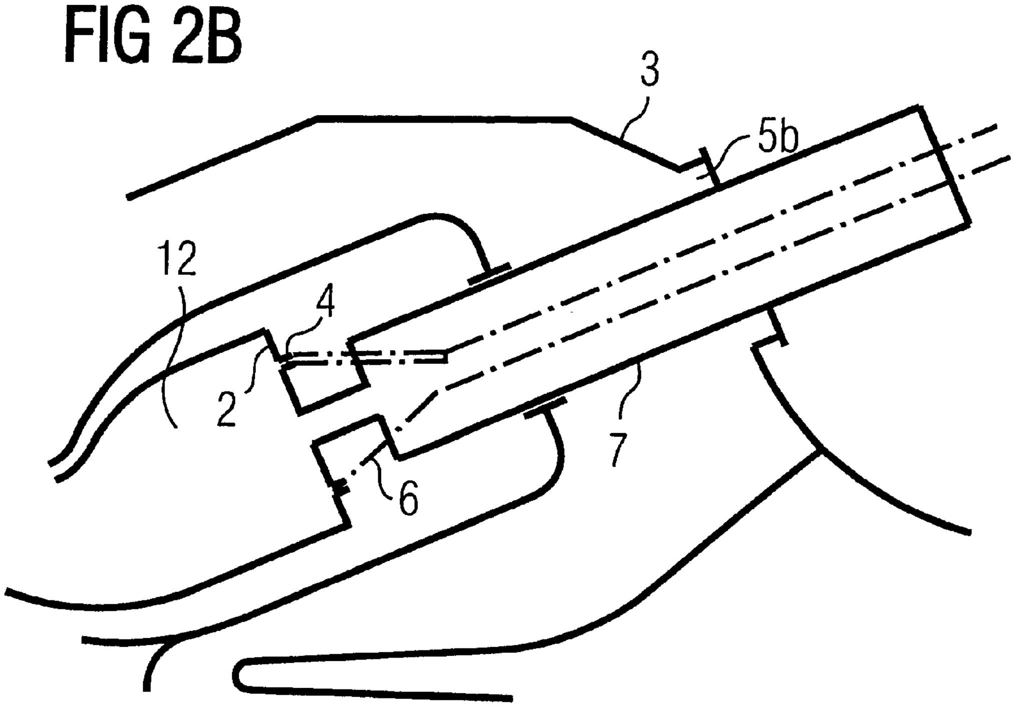
Figure 3A:
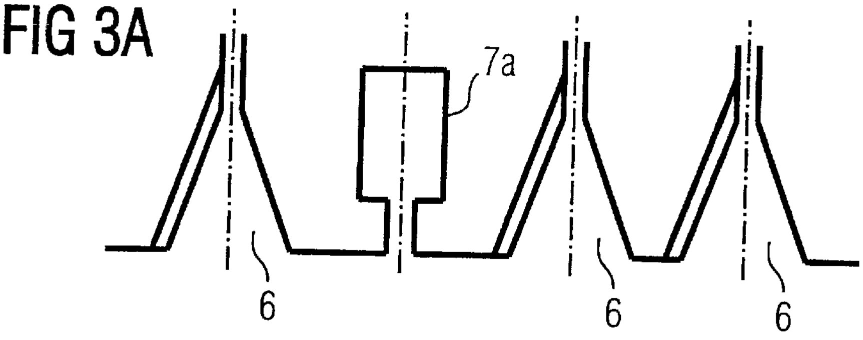
Figure 3B:
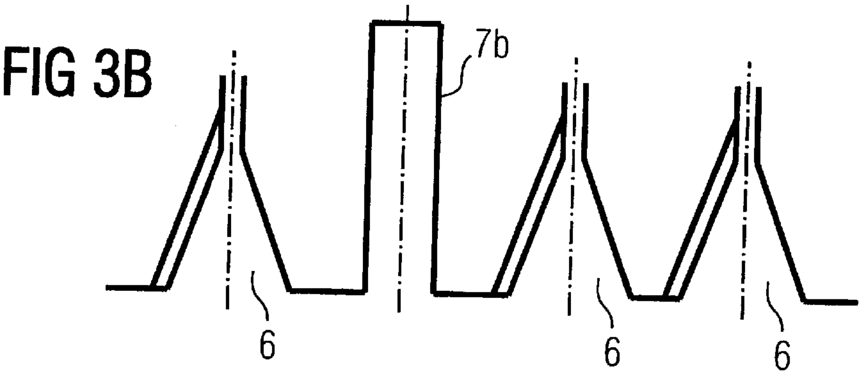
Figure 4A:
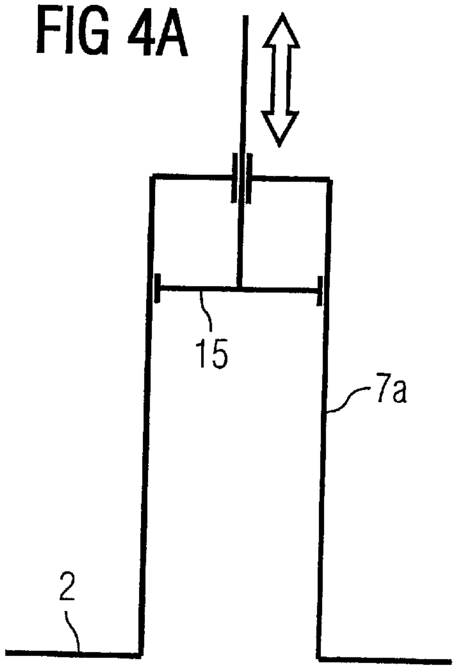
Figure 4B:
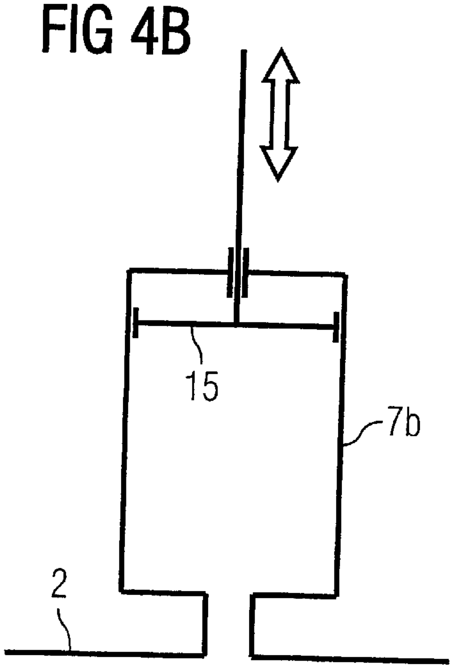

The invention is described below by way of example with reference to the drawing by way of embodiments without restriction of the general inventive concept. Arrows in the Figures symbolize mass flows. In the drawing FIG. 1 is a partial sectional illustration through a gas-turbine plant with a damping element;

FIG. 2*a* is a further partial sectional illustration of the gas turbine with the damping element shown enlarged;

FIG. 2*b* is a further partial sectional illustration of the gas turbine with the damping element shown enlarged;

FIG. 3*a* is a partial developed view of burners and damping elements arranged adjacent to one another in the peripheral direction of a gas turbine;

FIG. 3*b* is a further partial developed view of burners and damping elements arranged adjacent to one another in the peripheral direction of a gas turbine;

FIG. 4*a* shows a Helmholtz resonator with a tuning device;

FIG. 4*b* shows a $\lambda/4$ tube with a tuning device, and

Figure 5:
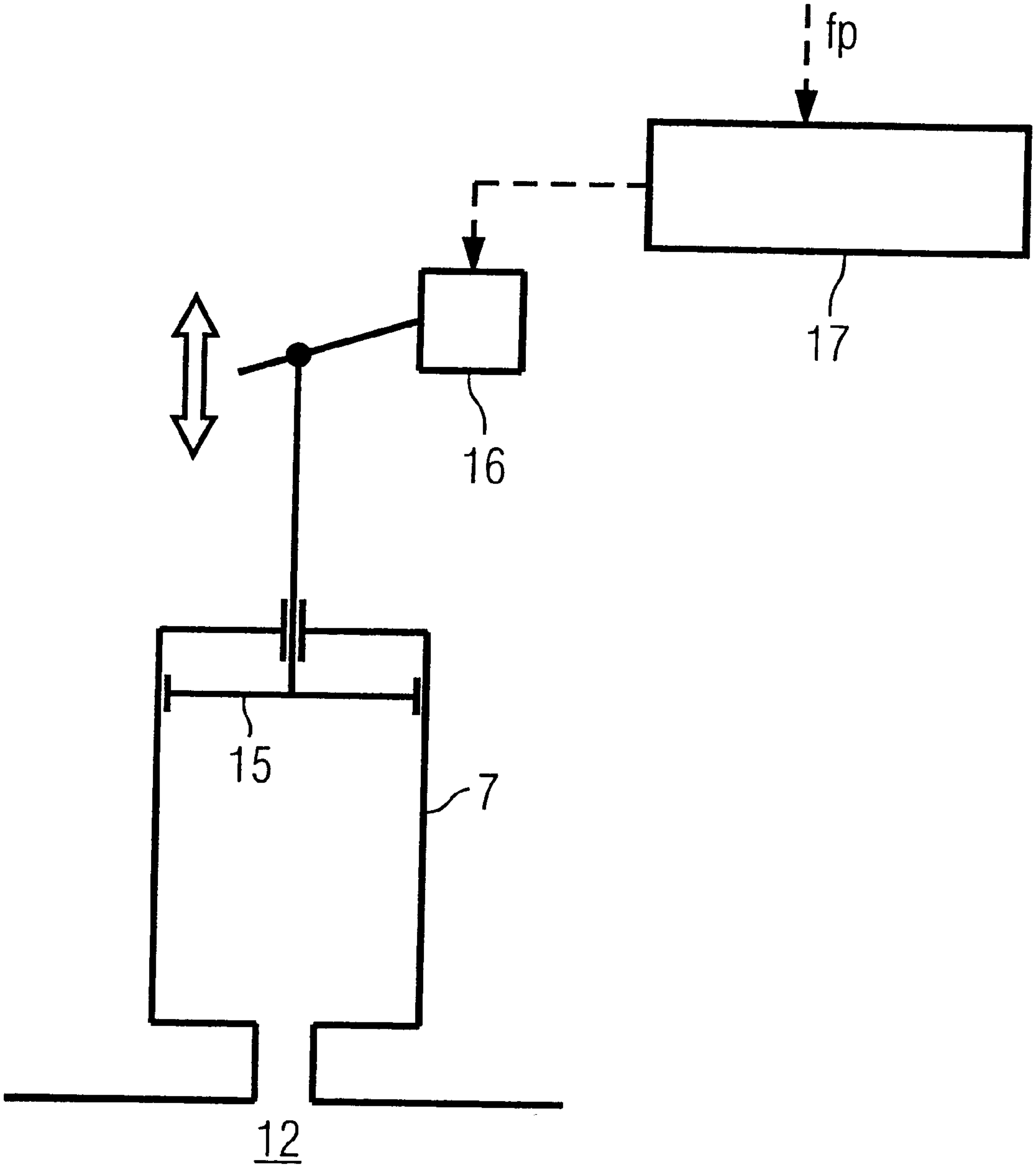

FIG. 5 shows a damping element connected to a regulating means.

WAYS OF PERFORMING THE INVENTION, INDUSTRIAL APPLICABILITY

FIG. 1 shows the halves of a gas-turbine plant 1 situated above a machine axis 11. A compressor 10 is arranged on a rotor 14 upstream of a combustion chamber 12 and a turbine stage 9 is arranged downstream of the said combustion chamber 12. The gas turbine 1 is covered by a turbine housing 3. Burners 6 project through openings 5*a* in the said turbine housing 3 into the gas turbine 1, the burners 6 likewise extending inside the gas turbine 1 through a combustion-chamber housing 8 as far as a front plate 2 which bounds the combustion chamber 12. Further openings 5*b*, through which a damping element 7 is inserted according to the invention, are present beside the said openings 5*a* in the turbine housing 3. In the embodiment shown, the damping element 7 illustrated projects out of the turbine housing 3. The openings 5*a* and 5*b* are of identical size, so that burners 6 or damping elements 7 can optionally be installed through these openings 5*a* and 5*b*. The same also applies to corresponding openings in the front plate 2, as is explained further below with reference to FIG. 2*a* and FIG. 2*b*.

The burners 6 preferably operate in accordance with the principle of pre-mixing, i.e. before highly compressed air (symbolized by arrows) is introduced into the combustion chamber 12 it is fed from the compressor 10 to the burners 6 and is mixed with fuel. The so-called pre-mix combustion ensures low combustion temperatures and thus desirably low values of harmful substances, and in this case in particular single-figure $No_x$ values.

Thermoacoustic oscillations, which can occur in pre-mix combustion, are reduced to an innocuous level by means of the damping elements 7 already mentioned. Since the thermoacoustic interference can be determined only after starting the gas-turbine plant 1, the installation of damping elements too is advisable and effective only then. Gas turbines in fact display an individual oscillation behaviour, so that only after manufacture can the individual oscillation behaviour be determined with respect to the excitation frequency and the excitation location of the interference. In accordance with the invention the provision is now made to provide the turbine housing of a gas-turbine plant 1 with openings 5*a* and 5*b*, so that burners 6 and damping elements 7 can be interchanged in accordance with an oscillation analysis in the operation-ready state.

The invention now goes one step further: Because of the projection of damping elements 7 beyond the turbine housing towards the outside, it is possible to tune the damping elements 7 even during the operation of the gas-turbine plant 1. For this purpose the damping element 7 is provided with a tuning device 15 by which the damping volume can be adapted directly to thermoacoustic interference caused by the operation. The previously known iterative and thus time-consuming methods of eliminating thermoacoustic interference, namely determining oscillation frequencies and locations of the greatest excitation under various operating conditions and subsequently shutting down and uncovering the plant, become totally unnecessary with the damping elements according to the invention. If the damping elements 7 are installed, the damping elements 7 can be adapted directly and during the operation of the gas turbine 1 by way of the tuning device 15 at various loading points.

In order that the damping element 7 may display a damping behaviour which is stable and thus substantially independent of temperature fluctuations, the damping element 7 has arranged thereon a flushing line 13 through which air of the compressor 10 compressed during operation is fed to the damping volume for cooling purposes. A specified quantity of air thus flows continuously from the damping volume into the combustion chamber 12. In this case the damping behaviour of a damping element 7 flushed in this way and thus cooled remains unaffected by the actual air flow.

FIG. 2*a* and FIG. 2*b* show two further arrangements of the invention in sectional illustrations. In this way, a damping element 7 in FIG. 2*a* is arranged completely between the front plate 2 and the closable opening 5*b*, whereas the damping element 7 in FIG. 2*b* projects through the closable opening 5*b* out of the turbine housing 3. As shown in FIG. 2*a* and FIG. 2*b*, the damping elements 7 are not provided with a tuning device 15. In addition, it may be seen that the openings 5*b* in the turbine housing 3 are arranged in alignment with further openings 4 in the front plate 2, so that damping elements 7 can be inserted through the opening 5*b* as far as the combustion chamber 12. This step affords an extremely simple and rapid assembly or dismantling respectively of the damping elements 7 or burners 6, as indicated in broken lines. Since the damping elements 7 and the burners 6 have the same attachment structure it is possible to replace damping elements and burners with one another as desired and to insert them in the openings 4.

FIG. 3*a* and FIG. 3*b* are each a partial developed view of burners 6 and damping elements 7*a*, 7*b* otherwise arranged adjacent to one another in the peripheral direction. FIG. 3*a* contains a Helmholtz resonator as a damping element 7*a* and FIG. 3*b* discloses a λ/4 7*b* tube as a damping element 7*b*. The two are preferably used at different frequencies. A Helmholtz resonator 7*a* is used more for damping oscillations of low frequencies, whereas a λ/4 tube 7*b* is used more at higher frequencies; in this case the frequency range for thermoacoustic interference in gas-turbine plants extends from approximately 50 Hz to 600 Hz, and preferably from 70 to 300 Hz.

FIG. 4*a* shows show influence can be exerted upon the volume in a Helmholtz resonator 7*a* by means of a tuning device 15 already described above. In this case a tuning device 15, which is designed in the manner of a stamp and which is movable along its stamping path (vide illustration with double arrow), is provided inside the volume of the Helmholtz resonator, as a result of which the Helmholtz volume can be adapted in a variable manner. FIG. 4*b* shows a tuning device 15 of this type in a λ/4 tube 7*b*. As a result of exerting influence upon the size of the volume of the Helmholtz resonator 7*a* or of the λ/4 tube 7*b*, an oscillation frequency to be damped can be tuned individually.

An arrangement of the tuning which goes still further is illustrated in FIG. 5. In this case the tuning device 15 is connected by way of a control device 16 to a regulating means 17. If a fixed oscillation frequency $f_p$ is pre-set to the regulating means 17, the regulating means 17 will set the volume of the damping element 7 accordingly by way of the control device 16, in order to tune the damping element 7 to the oscillation frequency $f_p$ to be damped. In this case an open regulating circuit is involved. As an alternative to this open regulation, the oscillation frequency $f_p$ can be measured in the combustion chamber 12 and can be supplied as an actual value directly to the regulating means 17, after which the size of the volume is passed on as a nominal value to the control device 16. This results in a closed regulating circuit which automatically permits a rapid and individual tuning to thermoacoustic interference at any operating point of the gas-turbine plant.

It is pointed out that each burner 6 and each damping element 7 in a gas turbine 1 can occupy any suitable position; in this way, burners 6 and/or damping elements 7 can be arranged both adjacent to one another radially and adjacent to one another in the peripheral direction. In this case, it is optionally possible to fall back on flushing for cooling purposes, as described above.

LIST OF REFERENCES

1 gas-turbine plant
2 front plate
3 turbine housing
4 opening in the front plate
5*a*, 5*b* opening in the turbine housing
6 burner
7 damper
7*a* Helmholtz resonator
7*b* λ/4 tube
8 combustion-chamber housing
9 turbine stage
10 compressor
11 machine axis
12 combustion chamber
13 flushing line
14 rotor
15 tuning device
16 control device
17 regulating means
$f_p$ oscillation frequency

What is claimed is:

1. A damper arrangement for reducing combustion-chamber pulsations arising inside a gas turbine, comprising:
   - a combustion-chamber housing, said combustion-chamber housing having a front plate at an upstream side;
   - a plurality of individual burners and damping elements projecting through the front plate;
   - said combustion-chamber housing being connected at a downstream side to a turbine stage and being surrounded by a turbine housing;
   - said turbine housing having first openings through which the burners project in an upstream direction, and closable second openings adjacent to the first openings and through which the damping elements are adapted to be inserted and tuned.

2. The damper arrangement according to claim 1, wherein the first openings and the closable second openings in the turbine housing are substantially the same configuration.

3. The damper arrangement according to claim 1 or 2, wherein third openings are provided through the front plate, said burners and said damping elements projecting through said third openings.

4. The damper arrangement according to claim 3, wherein the third openings through the front plate are each of substantially the same configuration.

5. The damper arrangement according to claim 1 or 2, wherein a distance provided between the front plate and the closable second openings of the turbine housing is sufficient such that a damping element can be inserted completely between the front plate and the turbine housing.

6. The damper arrangement according to claim 1 or 2, wherein the damping elements each project upstream through a corresponding closable second opening in the turbine housing and are releasably connected thereto.

7. The damper arrangement according to claim 3, wherein the combustion chamber is an annular combustion chamber, the front plate is annular, and the third openings in the front plate are arranged adjacent to one another in at least one of the peripheral direction and the radial direction with respect to the annular front plate.

8. The damper arrangement according to claim 3, wherein the third openings through the front plate and the first and second openings in the turbine housing are arranged coaxially with one another.

9. The damper arrangement according to claim 1 or 2, wherein the damping elements each have a damping volume and are designed in the manner of at least one of a Helmholtz resonator and a $\lambda/4$ tube.

10. The damper arrangement according to claim 9, wherein at least part of the damping volume of a damping element projects beyond the turbine housing to the outside of the turbine housing.

11. The damper arrangement according to claim 10, wherein a tuning device that influences the damping behavior of a respective damping element is provided outside the turbine housing.

12. The damper arrangement according to claim 11, wherein the tuning device can be operated in at least one of an open regulating circuit, independently of combustion-chamber pulsations which arise, and a closed regulating circuit, in direct dependence upon combustion-chamber pulsations which arise.

13. The damper arrangement according to claim 12, wherein the oscillation frequency (fp) of the combustion-chamber pulsations can be supplied to said tuning device operating in a closed regulating circuit.

14. The damper arrangement according to claim 1 or 2, wherein each damping element is connected to a flushing line for cooling purposes.

* * * * *